United States Patent [19]
Bergquist et al.

[11] Patent Number: 6,031,672
[45] Date of Patent: Feb. 29, 2000

[54] METHOD AND APPARATUS FOR SERVO DATA PATTERN DETECTION

[75] Inventors: Mark Andrew Bergquist; Jonathan Darrel Coker; Richard Leo Galbraith; Rick Allen Philpott; David James Stanek, all of Rochester, Minn.

[73] Assignee: International Business Machines Corporation, Armonk, N.Y.

[21] Appl. No.: 08/767,970

[22] Filed: Dec. 17, 1996

[51] Int. Cl.[7] ............................... G11B 5/09; G11B 5/596
[52] U.S. Cl. ......................... 360/46; 360/51; 360/77.08
[58] Field of Search ............................... 360/46, 48, 51, 360/77.08

[56] References Cited

U.S. PATENT DOCUMENTS

| | | | |
|---|---|---|---|
| 4,808,884 | 2/1989 | Hull et al. | 375/120 |
| 4,845,575 | 7/1989 | Wahler | 360/51 |
| 4,897,740 | 1/1990 | Suzuki | 360/51 |
| 4,908,722 | 3/1990 | Sonobe | 360/46 |
| 5,047,877 | 9/1991 | Herting | 360/51 |
| 5,068,753 | 11/1991 | Kanegae | 360/46 |
| 5,121,262 | 6/1992 | Squires et al. | 360/46 |
| 5,170,297 | 12/1992 | Wahler et al. | 360/51 |
| 5,255,131 | 10/1993 | Coker et al. | 360/48 |
| 5,321,559 | 6/1994 | Nguyen | 360/46 |
| 5,343,340 | 8/1994 | Boutaghou et al. | 360/77 |
| 5,359,586 | 10/1994 | Izumi et al. | 369/59 |
| 5,362,993 | 11/1994 | Aubry | 360/77.08 |
| 5,402,274 | 3/1995 | Miyazawa et al. | 360/51 |
| 5,576,906 | 11/1996 | Fisher et al. | 360/51 |
| 5,706,222 | 1/1998 | Bonaccio et al. | 360/51 |

OTHER PUBLICATIONS

United States Patent Application Serial No. 08/397,593, filed Mar. 2, 1995 entitled "Method and Apparatus for Servo Pulse Detection with High AC Coupling and Large Pulse Asymmetry".

*Primary Examiner*—Aristotelis M. Psitos
*Assistant Examiner*—Regina Y. Neal
*Attorney, Agent, or Firm*—Joan Pennington

[57] ABSTRACT

Methods and apparatus are provided for detecting servo information in a direct access storage device. A plurality of data symbols are read from a disk to produce a readback signal. Each data symbol and each sequence of data symbols contains servo identification information. A correlation filter provides a matched filter function of an expected readback signal of the plurality of data symbols to produce a correlated readback signal. A threshold detector is coupled to the correlation filter for identifying a threshold signal representative of the data symbol. A data separator responsive to the threshold detector windows the threshold signal and provides clock and data signals. The data separator includes a digital variable frequency oscillator (VFO) which optimally centers incoming servo information from the disk in a timing window and provides standard clocked data for a servo processor. The threshold detector has a variable threshold voltage that is programmed using a trim digital-to-analog converter (DAC).

18 Claims, 8 Drawing Sheets

FIG. 5A

METHOD AND APPARATUS FOR SERVO DATA PATTERN DETECTION

FIELD OF THE INVENTION

The present invention relates to data pattern detection, and more particularly to servo data pattern detection method and apparatus in a direct access storage device (DASD).

DESCRIPTION OF THE PRIOR ART

Disk drive units incorporating stacked, commonly rotated rigid magnetic disks are used for storage of data in magnetic form on the disk surfaces. Data is recorded in radially spaced data information tracks arrayed on the surfaces of the disks. Transducer heads driven in a path toward and away from the drive axis write data to the disks and read data from the disks.

In direct access storage devices (DASDs), it is necessary to position the transducer heads over data tracks on the disk surfaces to properly record and retrieve data. It is necessary to measure the radial and circumferential position of the transducer heads flying above the disk surfaces. Radial position information is used to locate and maintain the head over circular tracks on the disk surface. Circumferential position information is used to identify the start of different information fields around the track circumference. The accuracy and reliability of head position measurements is very important, since poor tolerance in these measurements will degrade the performance and storage capacity of the DASD. Typically this is accomplished by providing servo information on one or more disk surfaces for reading by the transducer heads.

In a fixed block architecture (FBA) each data information track is divided into a predetermined number of equal-sized sectors. Each data sector typically has an identification (ID) field associated with it. The ID field contains information which identifies the data sector, and other information, such as flags to indicate defective sectors. Typically an addressing scheme is used where the data sectors are identified to the host system by a logical block number (LBN). The host computer sends a list of logical block numbers to be written or read. The disk drive controller converts the LBNs into zone, cylinder, head and sector (ZCHS) values. The servo system seeks to the desired zone, cylinder and head, and the disk drive begins reading ID fields until a match is found. Once the appropriate ID field has been read, the disk drive then reads or writes the following data field.

Pulse detection is universally used in servo systems, both to provide address mark and digital track identification information. Peak detectors are traditionally used.

Detection of address marks are hindered by the following effects: traditional signal-to-noise (SNR) concerns; track-to-track timing offsets during the servowriter process; and, when using (MR) heads: 1) nonlinear effects such as MR asymmetry, and 2) thermal asperities.

With the advent of PRML channels, two problems have arisen from the traditional use of peak detectors in the servo system. First, magnetic components which are optimized for the higher linear density enabled by PRML do not necessarily perform well with peak detectors, especially with various impairments which affect servo systems but not data systems. These impairments include systematic erase band problems and side-track pickup from in-phase adjacent tracks. Secondly, system costs are adversely affected by the hardware for the two incompatible detectors for peak detection and PRML.

In known servo systems using peak detection, one symbol consisting of a pair of opposing pulses called a dibit has been used. The servo processor utilizes digital identification information that is stored on the disk using relatively low frequency dibit patterns. Conventionally these dibits are read using servo peak detection circuitry, which is asynchronous.

Previous designs simply sent an asynchronous pulse to the servo processor whenever a dibit was detected, and it was up to the servo processor to properly frame these pulses and determine whether or not a dibit was detected in a given clock period.

Problems occur, for example, due to motor speed variation or other effects, so that the frequency of the dibits coming off the disk is different than the expected frequency. In this case, the asynchronous pulses indicating dibits could slip outside a crude timing window generated in the servo processor, and an error would occur.

Further, the requirement of dibit frequency being a fraction of the servo processor frequency is one of several factors which keeps servo field sizes large, and servo dibit frequencies well below the lowest data frequencies on the disk drive.

U.S. Pat. No. 5,255,131, entitled ASYNCHRONOUS SERVO IDENTIFICATION/ADDRESS MARK DETECTION FOR PRML DISK DRIVE SYSTEM," assigned to the present assignee and issued Oct. 19, 1993 to Jonathan D. Coker and Richard L. Galbraith, discloses improved apparatus and methods for servo detection. In the disclosed arrangement, problems of synchronicity in PRML were avoided by using a set of correlation filters, each designed for a particular pattern on the disk.

A need exists for an improved method and apparatus for detecting a servo data pattern in a direct access storage device (DASD). A need exists for improved methods for detection of the address mark/track ID function.

SUMMARY OF THE INVENTION

A principal object of the present invention is to provide improved methods and apparatus for detecting servo information in a direct access storage device.

In brief, methods and apparatus are provided for detecting servo information in a direct access storage device. A plurality of data symbols are read from a disk to produce a readback signal. Each data symbol and each sequence of data symbols contains servo identification information. A correlation filter provides a matched filter function of an expected readback signal of the plurality of data symbols to produce a correlated readback signal. A threshold detector is coupled to the correlation filter for identifying a threshold signal representative of the data symbol. A data separator responsive to the threshold detector windows the threshold signal and provides clock and data signals.

In accordance with features of the invention, the data separator includes a digital variable frequency oscillator (VFO) which optimally centers incoming servo information from the disk in a timing window and provides standard clocked data for a servo processor. The threshold detector has a variable threshold voltage that is programmed using a trim digital-to-analog converter (DAC).

BRIEF DESCRIPTION OF THE DRAWING

The present invention together with the above and other objects and advantages may best be understood from the following detailed description of the preferred embodiments of the invention illustrated in the drawings, wherein:

FIGS. 5A, 5B, 5C, and 5D together provide a schematic and block diagram illustrating a correlation dibit detector of the preferred embodiment of the servo channel of FIG. 3.

DETAILED DESCRIPTION OF THE PREFERRED EMBODIMENTS

Figure 1:
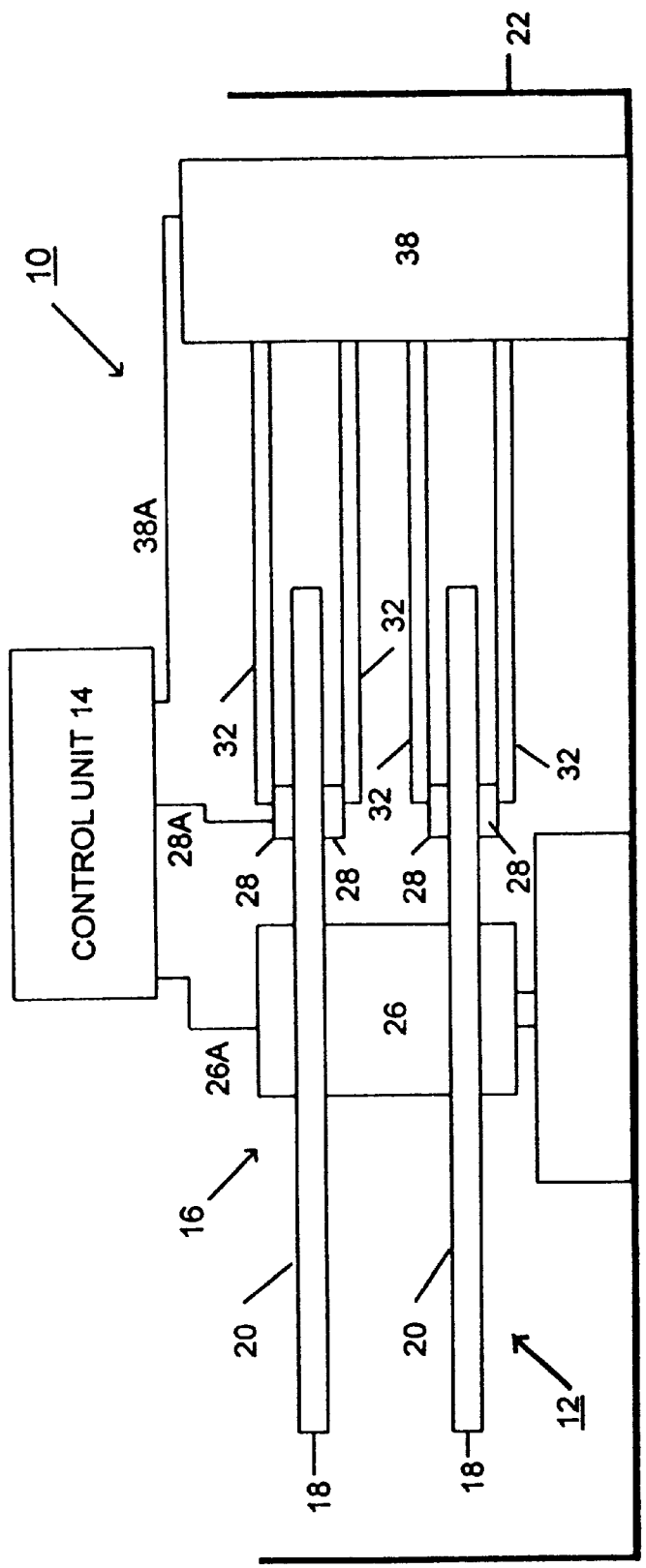
FIG. 1 is a schematic and block diagram of a data storage disk file embodying the present invention.
Figure 2:
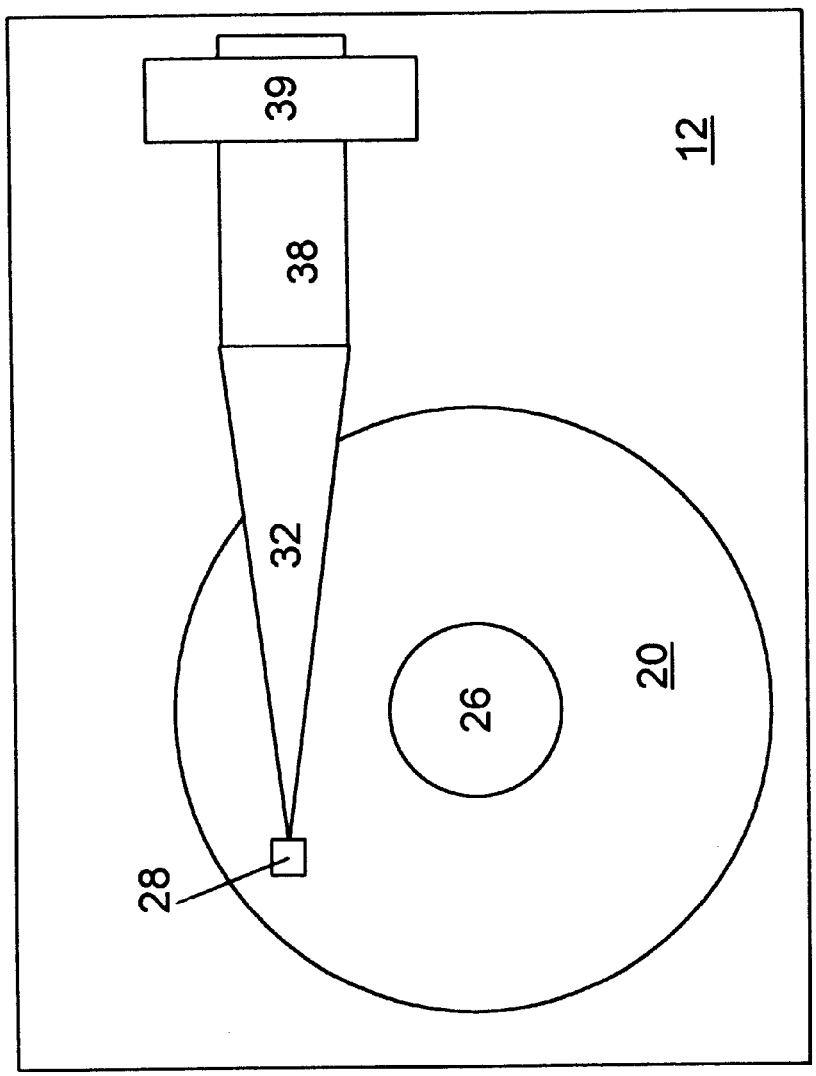
FIG. 2 is a schematic and block diagram plan view of the data storage disk file of FIG. 1.

Having reference now to the drawings, in FIG. 1 there is illustrated a data storage disk file generally designated as 10 including a rigid magnetic disk drive unit 12 and an interface control unit generally designated as 14. Unit 12 is illustrated in simplified and diagrammatic form sufficient for an understanding of the present invention. The utility of the present invention is not restricted to the details of a particular drive unit construction.

The disk drive unit 12 includes a stack 16 of disks 18 each having at least one magnetic surface 20. The disks 18 are mounted parallel to one another within a housing 22 for simultaneous rotation on and by an integrated spindle and motor assembly 26. Information on each magnetic disk surface 20 is read from or written to the disk surface 20 by a corresponding transducer head assembly 28 movable in a path having a radial component across the rotating disk surface 20.

Each transducer head assembly 28 is carried by an arm 32. The arms 32 are ganged together for simultaneous pivotal movement by a head drive servo motor 38 including a voice coil 39 cooperating with an internal magnet and core assembly. Drive signals applied to the voice coil 39 cause the arms 32 to move in unison to position the transducer head assemblies 28 in registration with information storage tracks on the disk surfaces 20 where information is written or read.

The disk drive unit 12 is controlled in operation by signals provided by the control unit 14, including motor control signals on line 26A and head position control signals on line 38A. In a typical arrangement, control unit 14 provides an interface with a computer that provides data read and write commands, and data signals are transmitted to or from the transducer head assemblies over corresponding lines 28A, one of which is seen in FIG. 1. Servo position information is recorded on the disk surfaces 20, and the transducer head assemblies 28 read this servo information to provide a servo position signal to the control unit 14. This information is employed by the control unit 14 to provide position control signals on line 38A. The purpose of this position feedback system is to assure accurate and continuous positioning of the transducer head assemblies 28 so that data is written to and read from precise locations on the disk surfaces 20.

Figure 3:
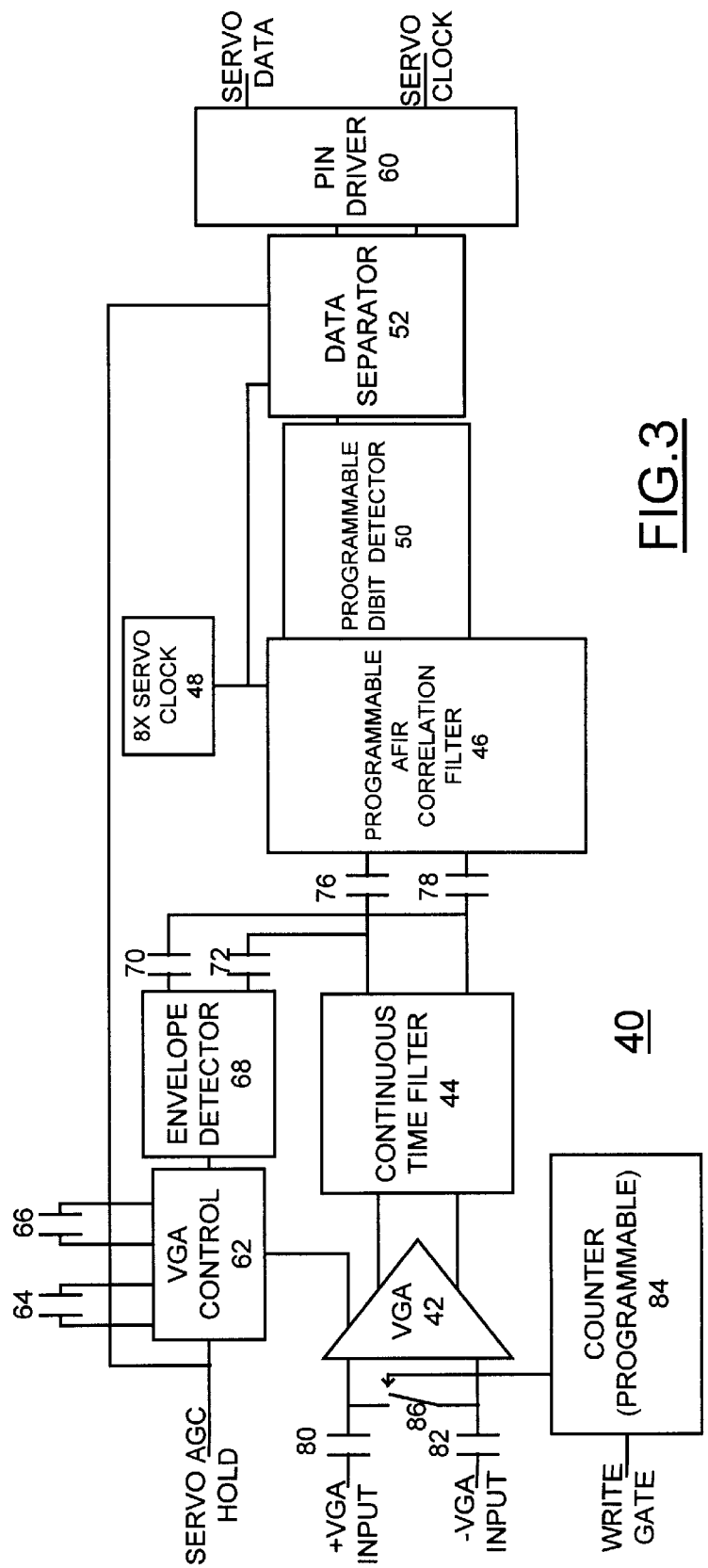
FIG. 3 is a schematic and block diagram illustrating a servo channel of the preferred embodiment of the data storage disk file of FIG. 1.

In FIG. 3, a high-level block diagram of the servo channel 40 of the preferred embodiment is illustrated. A differential dibit servo readback signal is received from arm electronics (AE) coupled to the head assemblies 28 and is amplified to the correct amplitude by a variable gain amplifier (VGA) 42. Next the amplified, differential signal is filtered using a continuous time filter (CTF) 44. The differential signal is then passed through a programmable analog finite impulse response (AFIR) correlation filter 46 running with an asynchronous sample clock that is equal to 8 times the SERVO CLOCK frequency applied by an 8× servo clock 48.

The AFIR correlation filter 46 is an implementation of what is called a matched filter. In brief, matched filter theory states that the optimum signal-to-noise ratio for a given signal in the presence of white noise is obtained by filtering the input signal by a filter whose frequency response is the Fourier transform of the expected signal. This is easily synthesized by a finite-impulse-response filter whose tap weights have the same shape as the expected input waveform. Thus, the AFIR correlation filter 46 is so named because it performs a mathematical correlation between the input signal and some expected input. A dibit signal having, for example, a separation of 4 servo clock cells is coupled to the AFIR correlation filter 46. It should be understood that the correlation concept does not require the use of dibits, however, their use provides the following advantages. First, the correlation filter for a dibit is able to use all of the signal energy in both pulses to maximum effect. The effective SNR is higher (by approximately √2) than if a single pulse was used. Secondly, the correlation filter for a dibit has zero DC response, which is a very useful property when considering AC recovery and thermal asperities.

The programmable AFIR correlation filter 46 with taps (0,0,0,+1,+1,0,0,−1,−1,0,0) is an approximation of an ideal correlation filter, which would have infinitely fine steps which outline the input dibit. The main error due to this approximation is the variation in amplitude with the sampling phase, which must be asynchronous with respect to the sampling clock. To qualify the dibit, the output of the filter 46 is simply compared to a programmable threshold using a dibit detector 50. If this signal exceeds the threshold, then a dibit of the proper sign is detected by the dibit detector 50.

The analog FIR filter 46 performs a matched filter function by having its tap weights set to the same shape as the expected dibit input signal. The dibit detector 50 for detecting servo symbols or dibits of the preferred embodiment is illustrated and described with respect to FIGS. 5A–5D. The function of the dibit detector 50 is to perform a threshold detection on the servo signal that has been processed by the VGA 42, the CTF 44, and the AFIR filter 46. A data separator 52 receives the detected pulses from the dibit detector 50 and provides servo data and servo clock for a servo processor (not shown) via a pin driver 60.

Figure 4:
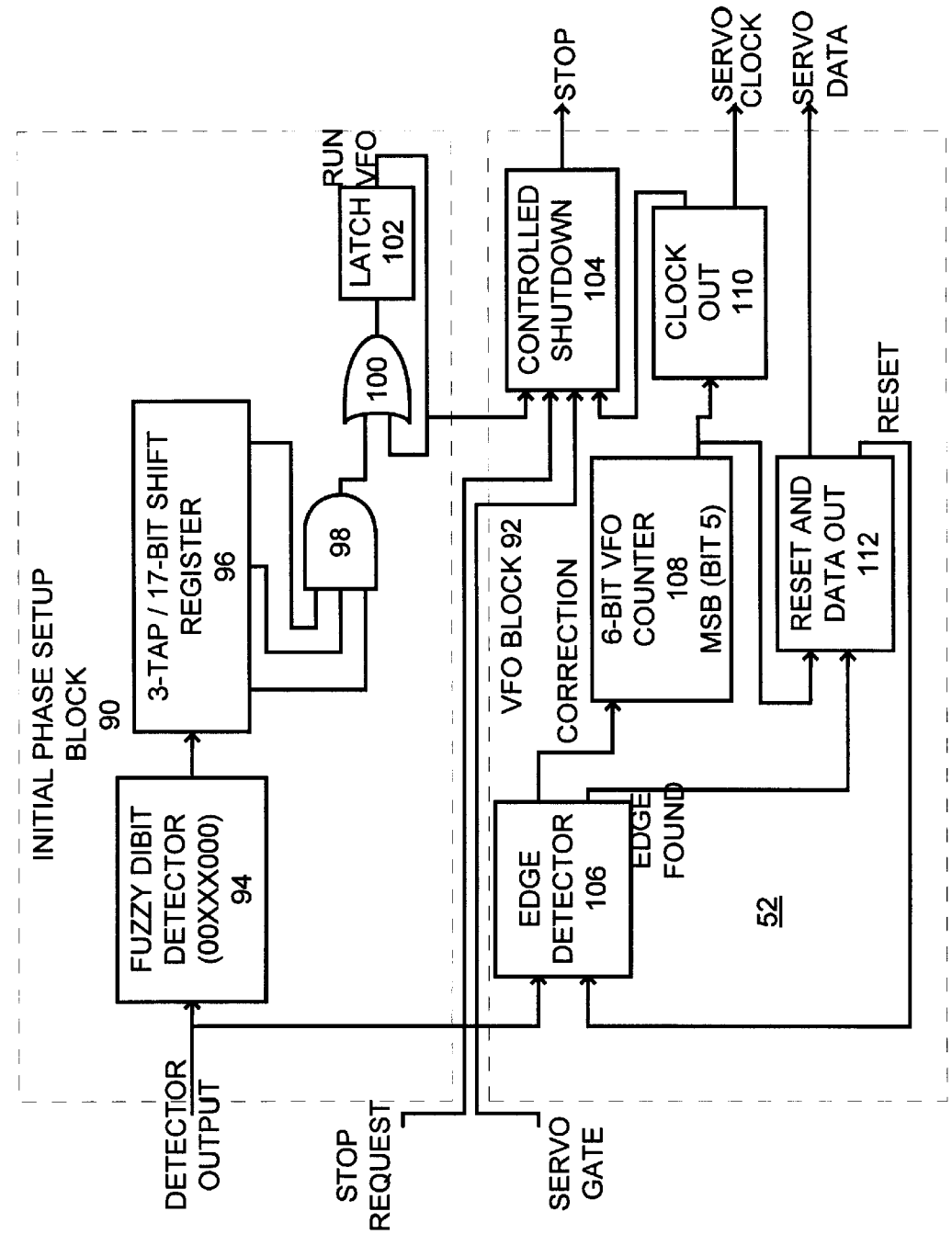
FIG. 4 is a schematic and block diagram illustrating a data separator of the preferred embodiment of the servo channel of FIG. 3.

The servo data separator 52 provides accurate framing of servo ID information, track ID, gray code, ECC and the like, using a digital voltage frequency oscillator (VFO), as illustrated and described with respect to FIG. 4. The data separator 52 receives the output of the dibit detector 50, frames it and outputs standard clock and data over the shared, two line interface to the servo processor. The data separator 52 is clocked with the same 8× frequency signal as the AFIR correlation filter 46 so asynchronous capture is not necessary. An asynchronous start signal at a line labeled SERVO AGC HOLD is applied to the data separator 52 and a VGA control 62. It should be understood that the data separator 52 could be started with other signals. The data separator 52 is not clocked until the asynchronous start signal is received. A data VGA capacitor 64 and a servo VGA capacitor 66 are connected to the VGA control 62. The VGA control is connected to an envelope detector 68 and the VGA 42. The output of the envelope detector 68 is AC coupled via capacitors 70 and 72 to the output of the continuous time filter (CTF) 44 and are AC coupled via capacitor 76 and 78 to the AFIR correlation filter 48. The dibit signal is AC coupled to the VGA 42 via capacitors 80 and 82 under the control of a programmable counter 84. When counter 84 shorts a switch 86, no input is applied to the VGA 42. Each of the AC coupling circuits 80 and 82, 76 and 78, and 70 and 72 act as a high-pass filter.

In general the VGA 42 applies gain, the CTF 44 is a low pass filter, for example, set to around 40 Mhz to 60 Mhz low pass, and the AFIR filter 46 always applies a predetermined set of tap weights, such as (0, 1, 1, 0, 0, −1, −1, 0). The output of the analog FIR filter 46 is monitored by the dibit detector 50 followed by the data separator 52. The dibit detector 50 monitors the sampled, correlated signal from the analog FIR filter 46. The dibit detector 50 looks for the correlated signal to pass through a programmed threshold. Once the threshold is crossed the output of the dibit detector 50 goes high. The dibit detector 50 can be programmed to monitor either positive or negative correlated signal polarity from the analog FIR filter 46 to detect dibits of either polarity.

FIG. 4 illustrates a powerful, yet efficient, data separator 52 of the preferred embodiment. The data separator consists of two sections including an Initial Phase Setup Block 90 and a VFO Block 92. The Initial Phase Setup Block 90 is the only section clocking when the data separator 52 is started. The Initial Phase Setup Block 90 includes a fuzzy dibit detector 94, a shift register 96, an AND gate 98, an OR gate 100 and a latch 102. The Initial Phase Setup Block 90 samples the output of dibit detector 50 and the fuzzy dibit detector 94 compares the sampled output against a fuzzy mask, which allows between 1 and 3 clock period wide pulses to pass through to the shift register 96. The shift register 96 is a 17-bit shift register and has 3 taps to detect three pulses that are the correct distance apart. When this condition occurs, the VFO Block 92 is started via the RUN VFO output of latch 102, and the Initial Phase Setup Block 90 is stopped.

The VFO Block 92 is the main circuit of the data separator 52. To stop the servo data separator 52, a stop request is applied to a controlled shutdown block 104, and when the servo clock goes low, a stop is generated by the controlled shutdown block 104. Shutdown also is provided when the Servo Gate signal goes low. If the VFO Block 92 is never started, the data separator 52 will shut down immediately, since the Servo Clock is already low. The VFO Block 92 includes an edge detector 106 receiving the output of dibit detector 50 to find pulse edges, which are used to generate corrections to a 6-bit VFO counter 108. The 6-bit counter 108 provides a digital variable frequency oscillator (VFO) function. The top 3 bits of the VFO counter 108 represent the gross count, which immediately affect framing and clock. The bottom 3 bits of the VFO counter 108 represent the fine count, where corrections accumulate and eventually affect the gross count. In operation, the gross count of VFO counter 108 is incremented by 1 each bit time.

The VFO counter 108 controls the generation of both a clock and reset signal with the counter MSB (bit 5) applied to a clock out block 110 and a reset and data out block 112. The reset signal output of block 112 defines a servo timing window, and is used for clearing the edge found memory or edge detector 106. The edge found memory 106 is used to generate the data signal. If an edge is detected, then Edge Found goes high and stays high until the Reset signal output of block 112 clears the edge detector 106. Also, as soon as an edge is detected, edge detector 106 generates correction pulses for a bit time, which causes a correction to be applied to the VFO counter 108, the sign and magnitude of the correction is determined by the top 3 bits of the counter at the time of the correction. The most significant bit (MSB) is the Clock after one bit time of delay, and the falling edge of the MSB generates the Reset signal which clears the Edge Found memory. Thus if no corrections were applied, the Clock is the bit clock divided by 8 exactly, and the Reset signal would occur every 8th bit time.

The following Table 1 details the correction made at a certain gross count, where the total correction is the correction plus 1, since the gross count is incremented by 1 each bit time.

TABLE 1

Correction vs. Gross Count

| Gross Count | Correction | Total Correction | Binary Correction |
|---|---|---|---|
| 0 | +7/8 | +1 7/8 | 001111 |
| 1 | +5/8 | +1 5/8 | 001101 |
| 2 | +3/8 | +1 3/8 | 001011 |
| 3 | +1/8 | +1 1/8 | 001001 |
| 4 | −1/8 | +7/8 | 000111 |
| 5 | −3/8 | +5/8 | 000101 |
| 6 | −5/8 | +3/8 | 000011 |
| 7 | −7/8 | +1/8 | 000001 |

Note that there is no gross count that will result in a zero correction. The only time corrections are not made is when a dibit is not seen during a frame.

Since this circuit is assumed to be started over an AGC field, and since the Initial Phase Setup Block has turned on the VFO 108 when the dibit data is in a certain phase, the counter 108 can be preset to center the framing window based on that phase. Since the fuzzy dibit detector 94 is used, the phase of the dibit data has a +/−1 bit time uncertainty, but nominally, framing will begin exactly centered.

Features of the data separator 52 include reduced complexity of the servo processor or glue logic by integrating the windowing function into the data separator. The data separator 52 provides standard clock and data signals to the servo processor. The data separator 52 includes fault-tolerant, zero-phase lockup for quick initialization of the digital VFO 108. The digital VFO 108 runs at 8 times the servo dibit frequency, for precision windowing of the dibit pulses. VFO corrections are proportional to error from the center of the window. A VFO correction is not made if a dibit is not detected in a window. The data separator 52 uses low power due to the advanced clocking architecture which shuts off blocks 90 and 92 as soon as their function is completed. The data separator 52 enables higher frequency servo dibit patterns since the servo circuitry uses the same type of high frequency synthesizer used by the data channel for the disk file 10. Simulation has shown that the digital VFO 108 will properly frame even if the synthesizer derived pattern frequency and the servo writer pattern frequency are mismatched by 2%.

Figure 5A:
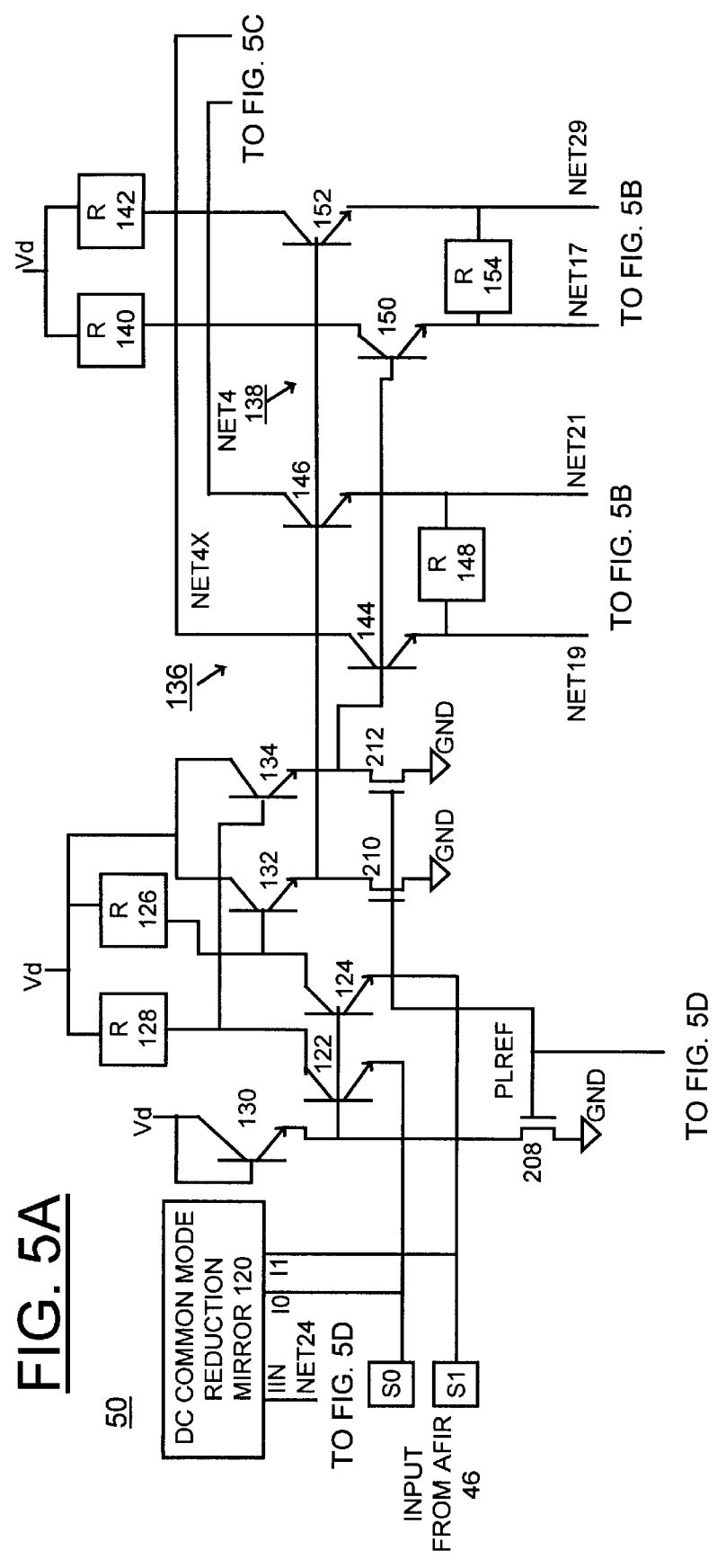
Figure 5B:
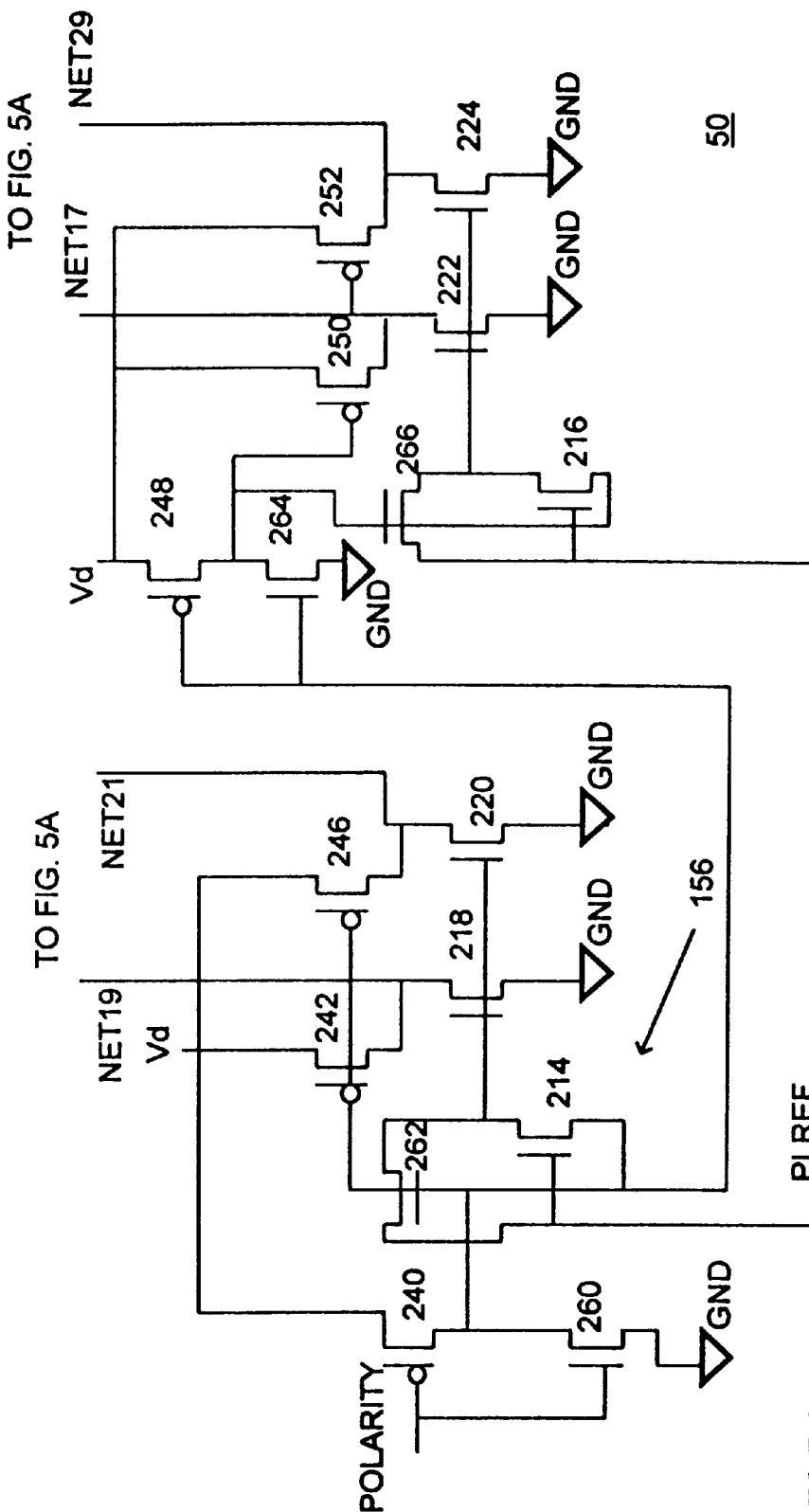

Referring now to FIGS. 5A–5D, in accordance with the preferred embodiment, dibit detector 50 includes a variable threshold voltage that programmed from 30% to 90% (in 4% steps) of the maximum possible correlated AFIR signal. Referring initially to FIG. 5A, dibit detector 50 receives a differential current from the AFIR filter 46 sinked from pins S0 and S1. A DC common mode current reduction mirror 120 adds a DC current into pins S0 and S1 to cancel part of the DC current from the AFIR filter 46 and multiples an applied constant DC current IIN. The differential current from the AFIR filter 46 are then passed through a common base stage pair of NPN transistors 122, 124 and converted to a voltage swing by resistors 126 and 128. The common mode current reduction mirror 120 adds DC current into pins S0 and S1 to cancel part of the DC current from the AFIR so that a reasonable DC common voltage can be maintained across resistors 126 and 128. An NPN transistor 130 provides an emitter voltage reference used by transistors 122, 124. The differential voltage from resistors 126 and 128 is emitter-followed by a pair of NPN transistors 132 and 134 into the inputs of two gain stages generally designated 136 and 138. The two gain stages 136 and 138 are emitter degenerated differential pairs that share common collector resistors 140 and 142. The first gain stage 136 includes a pair of NPN transistors 144, 146 and resistors 148, 140, and 142. The second gain stage 138 includes a pair of NPN transistors 150, 152, and resistors 154, 140, and 142. Only one gain stage 136 or 128 can be selected at one time by a logic block generally designated 156 in FIG. 5B. The inputs to each gain stage are flipped to provide that ability to invert the differential signal from the emitter-follower transistors 132 and 134 with the particular polarity of dibits to be detected is determined by an input POLARITY to the logic block 156 in FIG. 5B.

Figure 5C:
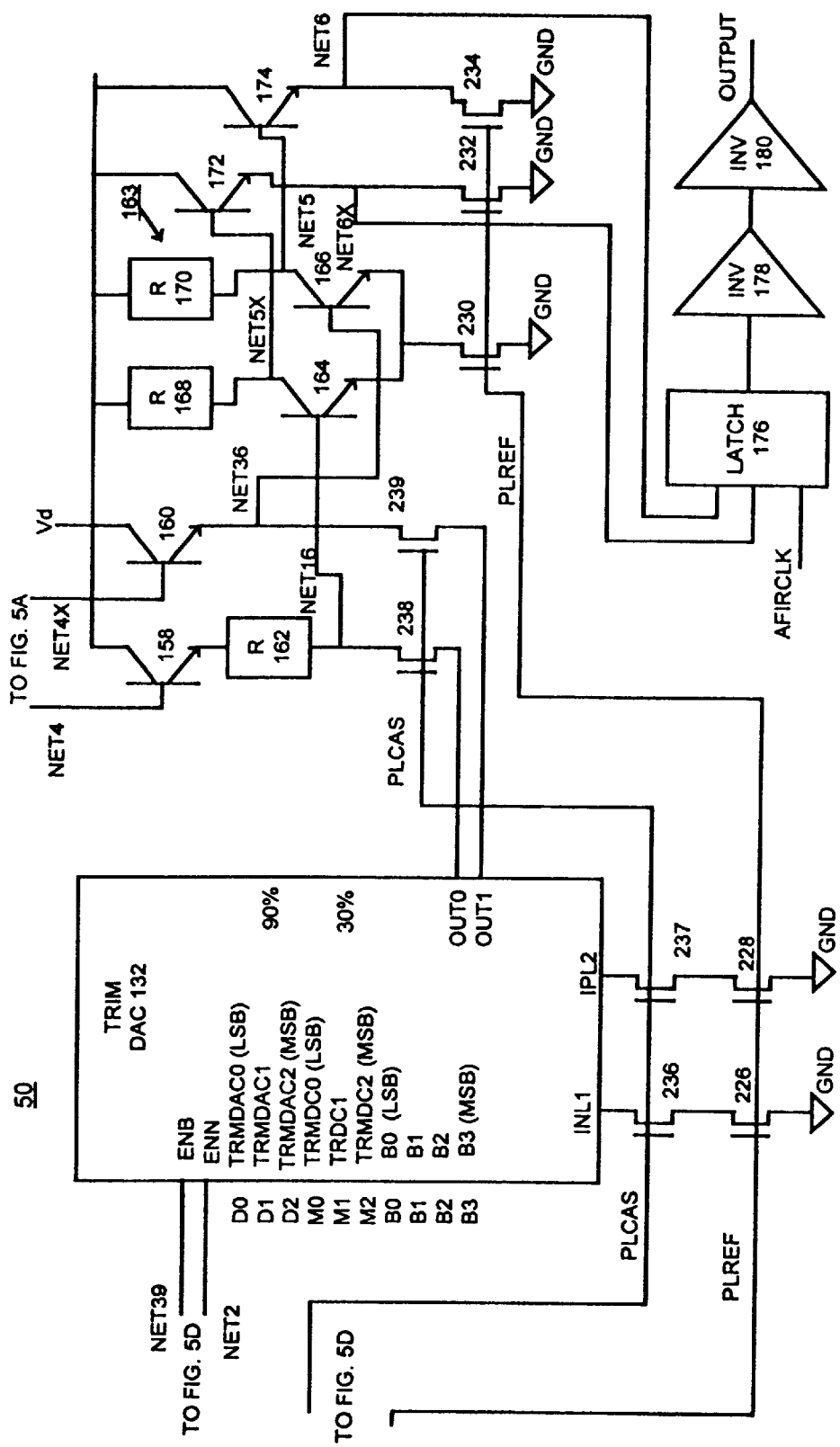

Referring now to FIG. 5C, the differential outputs of the gain stages 136 and 138 at lines labeled NET4 and NET4X are applied to a pair of emitter follower NPN transistors 158 and 160. A threshold resistor 162 connected to the emitter of transistor 158 provides the variable threshold voltage used to determine if the correlated AFIR signal represents a detected dibit. If the threshold set by threshold resistor 162 is crossed then the potential at line NET16 rises above NET36 which caused a high gain stage 163 including a pair of NPN transistors 164, 166 and resistor 168 and 170 to changes states. The output of the high gain stage 163 is then emitter-followed by a pair of NPN transistors 172 and 174 into a differential dynamic latch 176 that is clocked by the B-clock from the AFIR filter 146. The output dynamic latch 176 is inverted by a pair of series-connected inverters 178 and 180 and sent to the data separator 52 indicated at line labeled OUTPUT.

The threshold voltage across threshold resistor 162 is programmed by a trim digital-to-analog converter (DAC) 182. The currents from the trim DAC 182 at outputs OUT0, OUT1 are trimmed so that the threshold can be programmed for 30% to 90% in 4% steps of the maximum possible correlated AFIR signal as described below.

Figure 5D:
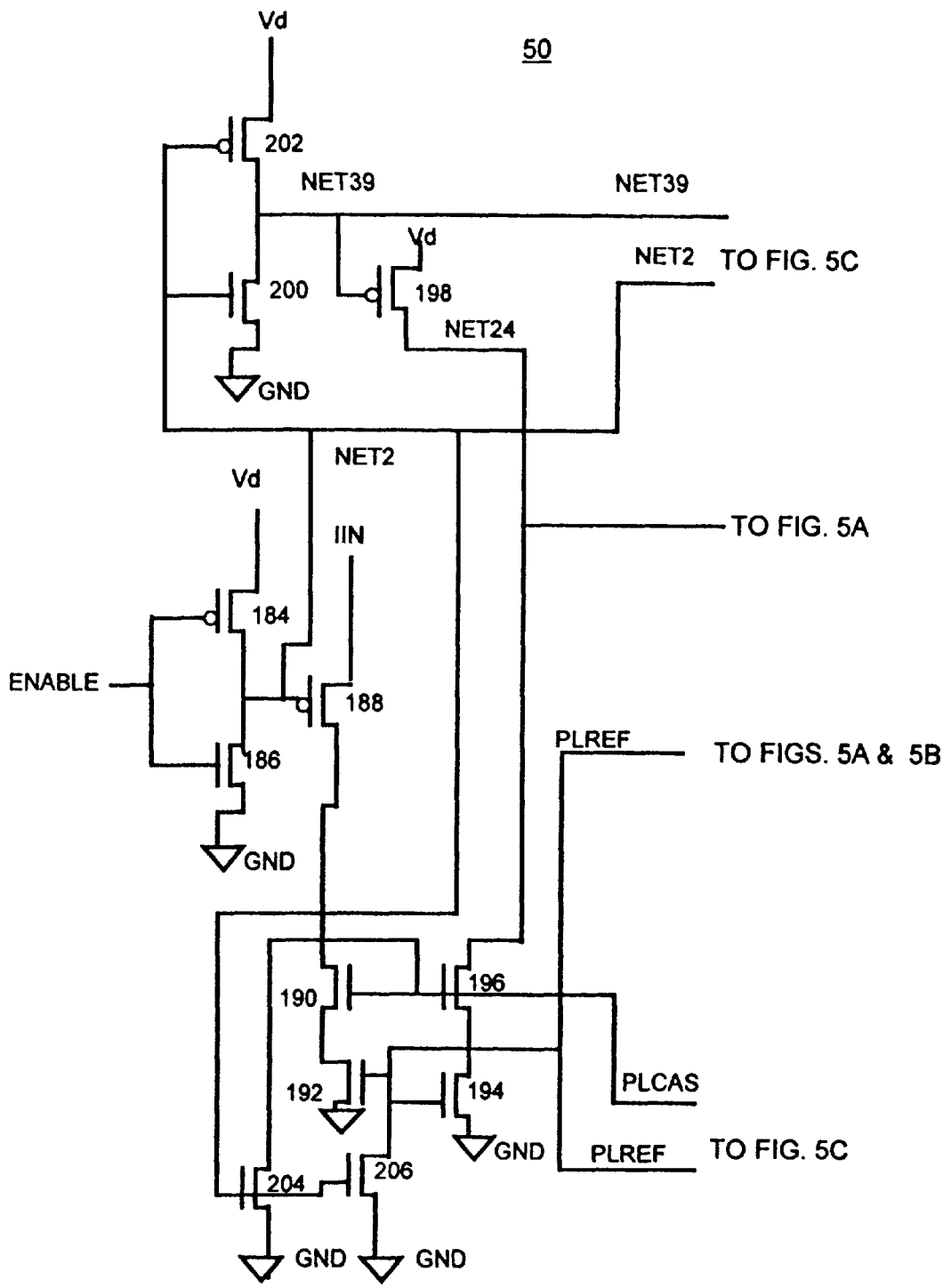

Referring to FIG. 5D, an ENABLE input to the dibit detector 50 is applied to a gate of a P-channel field effect transistor PFET 184 and a N-channel field effect transistor NFET that are connected to a gate of a PFET 188 that receives the constant DC current IIN. Current mirror NFETs 190 and 192 set up a CASCODE reference voltage PLCAS and a reference voltage PLREF, respectively. PLREF is coupled to the gate of current mirror NFET 194 and the drain of NFET 196 with line labeled NET 24 connected to the common mode current reduction mirror 120 and PFET 198. THE gate of PFET 198 is connected between the series connected NFET 200 and PFET 202 and is connected to an enable input ENB of trim DAC 182. The gate of series connected NFET 200 and PFET 202 is connected to an enable input ENN of trim DAC 182. The gate of series connected NFET 200 and PFET 202 is connected to a gate of a pair of NFETs 204 and 206 at a line labeled NET2. Referring also to FIGS. 5A, 5B, and 5C, PLREF is coupled to the gate of current mirrors NFETs 208, 210, 214, 216, 218, 220, 222, 224, 226, 228, 230, 232, and 234. PLCAS is coupled to the gate of current mirrors NFETs 236, 237, 238, and 299. Current inputs IPL1, IPL2 of the trim DAC 182 are applied by NFETs 236, 226, 237 and 228. Trim current outputs OUT0, OUT1 of the trim DAC 182 are applied to NFETS 238, 239 for adjusting the voltage threshold across threshold resistor 162.

Referring to FIG. 5B, the polarity logic block 156 includes the current mirrors NFETs 214, 216, 218, 220, 222, 224, a plurality of PFETs 240, 242, 244, 246, 248, 250 and 252, and a plurality of NFETs 260, 262, 264, 266, arranged as shown. With a high POLARITY input to the polarity logic block 156, NPN transistors 144, 146 are selected, with NFETs 218 and 220 on. With a low POLARITY input to the polarity logic block 156, NPN transistors 150, 152 are selected, with NFETs 222 and 224 on.

Trimming the dibit detector 50 to a threshold requires a repetitive test with a reduced dibit for an input and a percentage of detected as an output. Multiple factors require a repetitive/percentage test, including primarily noise at VGA 42 and CTF 44, the harmonic content of the input signal, and that the output of the AFIR filter 46 varies with respect to the phasing of when the input signal is sampled.

With over sampling by 8× and having 8 active sample and holds doing correlation at any one time, the phase effects of sampling with only an 8× over sample result in a peak when sampled on the shoulders of the incoming wave and a minimum when sampled at the peak of the incoming wave. The peak of the correlated signal can vary by as much as +−7.7%. This makes it very difficult to trim the threshold to +−2.0%, a desired criteria, at the 30% threshold and 90% threshold points.

To eliminate the effects of sampling phase on threshold trim of the correlation signal a square wave input is used. When a square wave is used the sampling always lands on peaks at least for one correlated sample output. The correlated signal is then independent of sample phase. The peak of the correlated signal no longer varies with the sample phase, however the maximum amplitude is no longer 600 mV. Trim is done at 30% and 90% of a 600 mV output or a maximum shoulder sampled input signal. To correct for the increased correlated signal amplitude output one has to reduce the input, as defined by the equation below.

To calculate the required VGA input for trim, the following equation is used:

$$\text{VGA Input in mVpp} = \{(V1) \times (V2) \times (P1)\} / \{(T1) \times (W1) \times (V3)\};$$

where (V1) is the pp input signal for the VGA setup (100 mVpp); where (V2) is the maximum pp Correlated output of a 1st and 3rd harmonic dibit signal (1200 mV); where (P1) is the correlated percentage, same as Threshold (0.3 or 0.9 for 30% and 90%); where (T1) is the number of taps (4); where (W1) is the tap weight gain multiplier (0.4755); and where (V3) is the pp VGA output (800 mVpp).

Trim for the correlation dibit detector 50 is provided at 30% and 90%. Trim is done while SERVO AGC HOLD is active. First a full amplitude signal (say 100 mVpp) is put into the VGA with Hold not active, the VGA gain adjusts to output a 800 mVpp signal. After SERVO AGC HOLD is activated, the input signal is reduced to give a 30% correlated signal at the output of the AFIR filter 46 by reducing the input to 23.6 mVpp. At this point threshold trim begins.

Using the above equation, the VGA Input during SERVO AGC HOLD active for 90% trim is reduced from 100 mVpp to 71 mVpp.

There are 3 trim bits for adjustment at 30% are defined in the table 2 below. Trim at 30% needs to be completed prior to trim at 90% since the 30% DAC that is trimmed effects the 90% DAC.

TABLE 2

| Trim Bit | Weighting |
| --- | --- |
| D2 | MSB (16%) |
| D1 | LSB + 1 (8%) |
| D0 | LSB (4%) |

Trim begins by setting the threshold to 30%. A square wave is input with an amplitude of 100 mV with SERVO AGC HOLD low. This sets the gain so that the output of the VGA 42 coupled by CTF 44 to the AFIR correlation filter 46 is about 800 mVpp. Next servo AGC hold is activated by setting SERVO AGC HOLD to a high. Then the input is adjusted down to about 23.6 mVpp. The 90% trim bits should be set to a decimal value 0 during this time.

Starting with the 30% trim bits set to a decimal 0, trim continues with stepping the decimal value up by 1 code while monitoring the output of the correlation dibit detector 50. The number of detected pulses in a 2 microsecond window (using a 20 Mhz input) are counted and then the code value is increased to the next decimal value. With low order codes, 40 detected pulses are seen but as the code value increases the detected pulses go to zero. The final trim is set in the middle or as close to 20 detected pulses as possible.

There are 3 trim bits for adjustment at 90% are defined in the table 3 below.

TABLE 3

| Trim Bit | Weighting |
| --- | --- |
| D2 | MSB (16%) |
| D1 | LSB + 1 (8%) |
| D0 | LSB (4%) |

Trim begins by setting the threshold to 90%. A square wave is input with an amplitude of 100 mV with SERVO AGC HOLD low, which sets the gain so that the output of the VGA 42 coupled to the AFIR filter 46 is about 800 mVpp. Next servo AGC hold is activated by setting SERVO AGC HOLD to a high. Then the input is reduced to about 71.0 mVpp. The 30% trim bits are set as determined during the 30% trim adjustment.

Starting with the 90% trim bits set to a decimal 0, trim continues with stepping the decimal value up by 1 code while monitoring the output of the correlation dibit detector 50. The number of detected pulses in a 2 microsecond window are counted and then the code value is increased to the next decimal value. With low order codes, 40 detected pulses are seen but as the code value increases the detected pulses go to zero. The final trim is set in the middle or as close to 20 detected pulses as possible.

In brief summary, an approximate estimate of relative performance of this scheme to conventional peak detection with an effective signal seen at the threshold dibit detector 50 is approximately 3 times the amplitude of the input pulse. The actual number will vary somewhat with sampling phase and input pulse shapes. The noise power at the detector is 4 times that seen at the input, so the noise voltage is only twice as high. Thus, an improvement in SNR of approximately 50% over a peak detector whose dominant error mechanism is amplitude errors. Significant gains over peak detection are provided by dibit detector 50 due to the basic input SNR increases. The error due to track-to-track phase misalignment is roughly the same mathematically as the sampling phase variations, thus superior sensitivity to this mechanism are provided together with advantages with respect to TAs and recovery. The implementation of the correlation filter 46 requires only an incremental increase in complexity in the disk file 10, which already employs an analog FIR for the data path. As a result, superior performance with significantly lower channel costs and complexity are provided by the servo detection of the preferred embodiment.

While the present invention has been described with reference to the details of the embodiments of the invention shown in the drawing, these details are not intended to limit the scope of the invention as claimed in the appended claims.

What is claimed is:

1. Apparatus for detecting servo information in a direct access storage device comprising:

transducer means for reading a plurality of servo data symbols from a disk to produce a servo readback signal, each servo data symbol and each sequence of servo data symbols containing servo information;

correlation filter means for providing a matched filter function of an expected servo readback signal of said plurality of servo data symbols to produce a correlated servo readback signal;

threshold detector means coupled to said correlation filter means for identifying a threshold signal representative of said servo data symbol; and servo data separator means receiving a start signal and responsive to said threshold detector means for windowing said threshold signal and providing servo clock and servo data signals; said servo data separator means including an initial phase setup block and a variable frequency oscillator (VFO) block; said initial phase setup block being clocked responsive to said start signal and enabling said variable frequency oscillator (VFO) block responsive to detecting predetermined servo data symbols; said variable frequency oscillator (VFO) block providing said servo clock and servo data signals.

2. Apparatus for detecting servo information as recited in claim 1 wherein each said servo data symbol consists of a nonnegative, even number of pulses, whereby the average value of said servo readback signal is zero.

3. Apparatus for detecting servo information as recited in claim 1 wherein said servo data symbol includes a one data symbol consisting of a pair of opposing pulses or a dibit, and a zero data symbol consisting of zero signal or a DC erased disk portion.

4. Apparatus for detecting servo information as recited in claim 1 wherein said data separator has a clock input signal of a predefined multiple times said servo data symbol frequency.

5. Apparatus for detecting servo information as recited in claim 4 wherein said data separator initial phase setup block includes shift register means coupled to said threshold detector means for detecting said predetermined data symbols and logic means responsive to said predetermined data symbols detecting shift register means for enabling said VFO block; said logic means including an AND gate having an input coupled to said predetermined data symbols detecting shift register means and an output coupled to a latch, said latch providing a VFO block enable signal for enabling said VFO block.

6. Apparatus for detecting servo information as recited in claim 1 wherein said data separator variable frequency oscillator (VFO) block includes a digital variable frequency oscillator (VFO) for centering servo information in a timing window and providing said servo clock and servo data signals.

7. Apparatus for detecting servo information as recited in claim 6 wherein said data separator variable frequency oscillator (VFO) block includes edge detector means for receiving said threshold signal from said threshold detector means and detecting pulse edges and a counter having an input coupled to an output of said edge detector means.

8. Apparatus for detecting servo information as recited in claim 7 includes reset and data output means for providing said servo data signals and for resetting said edge detector means and wherein both said counter and said edge detector means includes an output coupled to said reset and data output means.

9. Apparatus for detecting servo information as recited in claim 8 includes control means for receiving a stop request and generating a controlled shutdown signal.

10. Apparatus for detecting servo information as recited in claim 9 wherein said control means is responsive to a servo gate signal for generating a controlled shutdown signal.

11. Apparatus for detecting servo information as recited in claim 1 wherein said threshold detector means includes a variable threshold level.

12. Apparatus for detecting servo information as recited in claim 11 further includes means for programming said variable threshold level of said threshold detector means.

13. Apparatus for detecting servo information as recited in claim 12 wherein said programming means includes a trim digital-to-analog converter (DAC).

14. Apparatus for detecting servo information as recited in claim 1 wherein said correlation filter means includes a finite impulse response (FIR) filter.

15. Apparatus for detecting servo information as recited in claim 14 wherein said FIR filter includes tap weights selected for said expected servo readback signal.

16. A method for detecting servo information in a direct access storage device comprising the steps of:

reading a plurality of servo data symbols from a disk to produce a servo readback signal, each servo data symbol and each sequence of servo data symbols containing servo information;

providing a matched filter function of an expected servo readback signal of said plurality of servo data symbols to produce a correlated servo readback signal, utilizing a correlation filter;

comparing said correlated readback signal with a threshold value to produce a threshold signal representative of said servo data symbol; and providing servo clock and servo data signals responsive to said threshold signal, utilizing a servo data separator; said servo data separator receiving a start signal and including an initial phase setup block and a variable frequency oscillator (VFO) block; said initial phase setup block being clocked responsive to said start signal and enabling said variable frequency oscillator (VFO) block responsive to detecting predetermined servo data symbols; said variable frequency oscillator (VFO) block providing said servo clock and servo data signals.

17. A method for detecting servo information as recited in claim 16 further includes the step of selecting said threshold value being compared with said correlated readback signal.

18. A method for detecting servo information as recited in claim 17 wherein the step of selecting said threshold value includes the steps of providing a trim adjustment of said threshold value at selected percentage values of said readback signal.

* * * * *